US008279985B2

(12) United States Patent
Liu

(10) Patent No.: US 8,279,985 B2
(45) Date of Patent: Oct. 2, 2012

(54) INTELLIGENT DEMODULATION SYSTEMS AND METHODS IN AN OFDMA MULTICELL NETWORK

(75) Inventor: Hui Liu, Sammamish, WA (US)

(73) Assignee: Adaptix, Inc., Carrollton, TX (US)

( * ) Notice: Subject to any disclaimer, the term of this patent is extended or adjusted under 35 U.S.C. 154(b) by 1786 days.

(21) Appl. No.: 11/062,890

(22) Filed: Feb. 22, 2005

(65) Prior Publication Data

US 2006/0188031 A1 Aug. 24, 2006

(51) Int. Cl.
H04B 1/10 (2006.01)
(52) U.S. Cl. ....... 375/350; 375/260; 375/346; 455/63.1; 455/63.4
(58) Field of Classification Search ................ 455/7, 25, 455/39, 206, 1, 4, 63.1–63.4, 130, 205; 375/259–261, 130, 140, 147, 148, 346–350; 367/14, 37–38, 59, 61
See application file for complete search history.

(56) References Cited

U.S. PATENT DOCUMENTS

| | | | |
|---|---|---|---|
| 6,128,355 A * | 10/2000 | Backman et al. ............. | 375/347 |
| 6,832,080 B1 | 12/2004 | Arslan et al. | |
| 7,248,841 B2 * | 7/2007 | Agee et al. ..................... | 455/101 |
| 2002/0044614 A1 | 4/2002 | Molnar et al. | |
| 2002/0122392 A1 | 9/2002 | Elezabi et al. | |
| 2003/0125040 A1 * | 7/2003 | Walton et al. .................. | 455/454 |
| 2004/0127223 A1 * | 7/2004 | Li et al. .......................... | 455/446 |
| 2004/0213328 A1 * | 10/2004 | Mills et al. ..................... | 375/136 |
| 2004/0247020 A1 * | 12/2004 | Mills et al. ..................... | 375/148 |
| 2004/0264561 A1 * | 12/2004 | Alexander et al. ............ | 375/232 |
| 2006/0171347 A1 * | 8/2006 | Attar et al. ..................... | 370/328 |

FOREIGN PATENT DOCUMENTS

CN 1501607 6/2004
JP 2004-523934 A 8/2004

OTHER PUBLICATIONS

Scalable OFDMA Physical Layer in IEEE 802.16 WirelessMAN, Intel Technology Journal, ISSN 1535-864X, vol. 8, Issue 3, published Aug. 20, 2004 [Retrieved on: Jan. 14, 2005] Retrieved from: www.intel.com/technology/itj/2004/volume08issue03/art03_scalableofdma/p04_basicsofdma.htm.

"Software Defined Core FastSwitching-OFDMA™—TDD "Operating system" for Next Generation Mobile Broadband Wireless Networks", Adaptix paper dated Dec. 21, 2004 Retrieved from: www.adaptix.com.

(Continued)

*Primary Examiner* — David C. Payne
*Assistant Examiner* — James M Perez
(74) *Attorney, Agent, or Firm* — Martin & Ferraro, LLP

(57) ABSTRACT

An OFDMA communication system includes a plurality of terminals, with at least one of the terminals including at least one type of multi-user decoder adapted to decode a signal intended for the at least one terminal received on a subchannel of the system and adapted to decode at least a portion of an interfering signal received on the subchannel. The system also includes a plurality of base stations. Each of the base stations may be in communication with others of the base stations for exchanging information about data throughput for particular terminals in cells of the system using particular subchannels in the cells. Each of the base stations assigns the subchannels to terminals in the cell of the base station so as to maximize data throughput in the entire system.

39 Claims, 4 Drawing Sheets

OTHER PUBLICATIONS

"Design Tradeoffs in OFDMA Uplink Traffic Channels", Article by Manyuan Shen, et al., University of Washington, Seattle, WA, IEEE Trans. Communication, Jun. 2005.

International Search Report and Written Opinion issued for PCT/US2006/004350; Dated: Mar. 21, 2008; 12 Pages.

Extended European Search Report issued for European Patent Application No. 06720457.8, dated Aug. 23, 2010, 11 pages.

Pados D.A. et al., "Near-ML Multiuser Detection With Linear Filters and Reliability-Based Processing", IEEE Transactions on Communications, IEEE Service Center, Piscataway, NJ, USA. vol. 51, No. 9, Sep. 1, 2003; pp. 1446-1450.

Office Action issued for European Patent Application No. 06 720 457.8, dated Apr. 20, 2011, 6 pages.

Hui Liu et al.; Downlink Dynamic Resource Allocation for Multi-cell OFDMA System: Signals, Systems and Computers, 2003, IEEE, Conference on Nov. 9-12, 2003, vol. 1, pp. 517-521.

Morinaga, N. et al.; "A study on techniques to estimate and notify inter-cell interference power on one-cell reuse OFDM Adaptive Modulation/TDMA systems"; Technical Report of the Institute of Electronics, Information and Communication Engineers, Japan, Jan. 7, 2004, vol. 103, No. 548, pp. 33-38.

Office Action issued for Japanese Patent Application No. 2007-556195, dated Aug. 17, 2011, 7 pages with English translation.

Gollamudi et al.; "Iterative Nonlinear MMSE Multiuser Detection;" Proceedings of the 1999 IEEE International Conference on Acoustics, Speech and Signal Processing, vol. 5; Mar. 1999.

Wang et al.; "Iterative (Turbo) Soft Interference Cancellation and Decoding for Coded CDM;" IEEE Transactions on Communications, vol. 47, No. 7; Jul. 1999.

Varanasi et al.; "Fast Stochastic Power Control Algorithms for Nonlinear Muitiuser Receivers;" IEEE Transactions on Communications, vol. 50, No. 11; Nov. 2002.

* cited by examiner

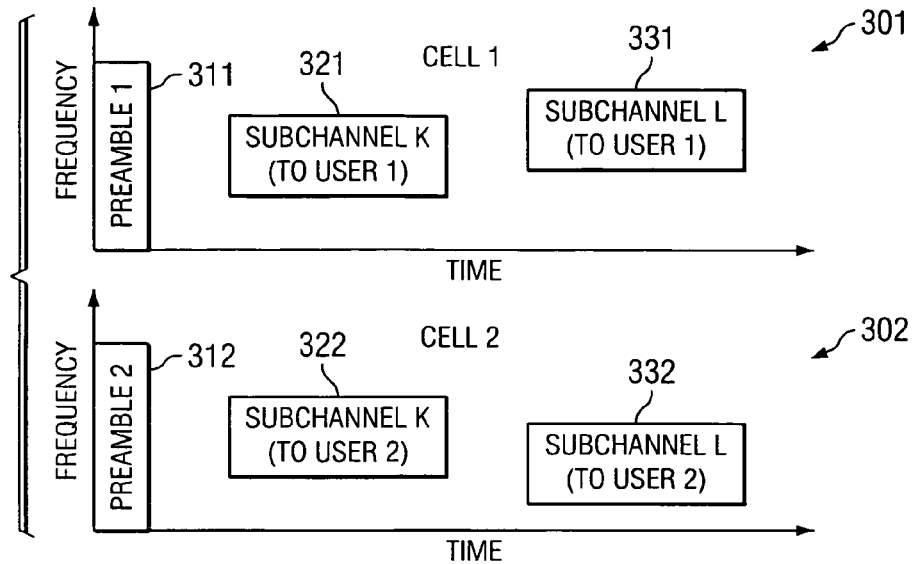
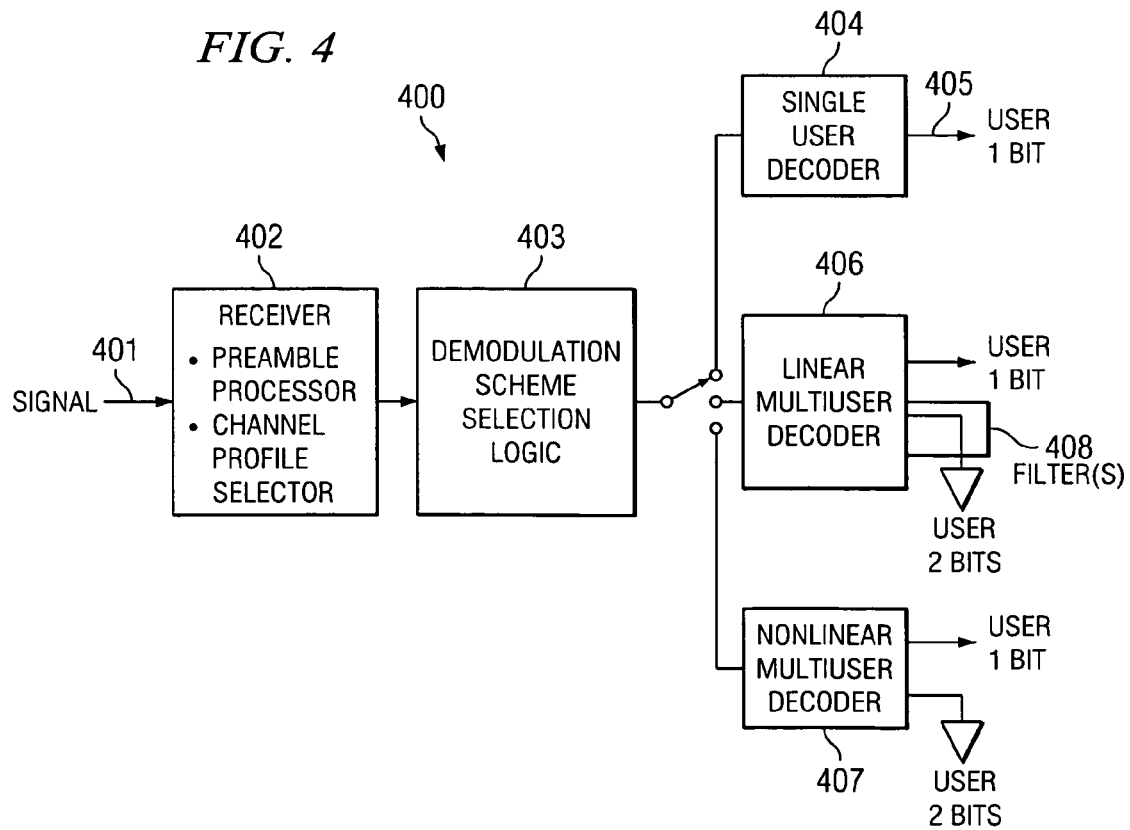

| ACHIEVABLE DATA RATE [BITS/S/HZ] | SINGLE USER DECODING | MULTIUSER DECODING |
|---|---|---|
| TERMINAL A | 2 | 3 |
| TERMINAL B | 1 | 5 |
| TERMINAL C | 3 | 3 |
| ∘<br>∘<br>∘ | ∘<br>∘<br>∘ | ∘<br>∘<br>∘ |

FIG. 7

| | CELL 1 | | | | CELL 2 | | | | CELL N | | |
|---|---|---|---|---|---|---|---|---|---|---|---|
| ACHIEVABLE DATA RATE [BITS/S/HZ] | SINGLE USER DECODING | MULTIUSER DECODING | | ACHIEVABLE DATA RATE [BITS/S/HZ] | SINGLE USER DECODING | MULTIUSER DECODING | | ACHIEVABLE DATA RATE [BITS/S/HZ] | SINGLE USER DECODING | MULTIUSER DECODING |
| TERMINAL (1,A) | 2 | 3 | ... | TERMINAL (2,A) | 0 | 2 | ... | TERMINAL (N,A) | 4 | 4 |
| TERMINAL (1,B) | 1 | 5 | ... | TERMINAL (2,B) | 2 | 3 | ... | TERMINAL (N,B) | 2 | 2 |
| TERMINAL (1,C) | 3 | 3 | ... | TERMINAL (2,C) | 2 | 3 | ... | TERMINAL (N,C) | 1 | 3 |
| ... | ... | ... | ... | ... | ... | ... | ... | ... | ... | ... |

INTELLIGENT DEMODULATION SYSTEMS AND METHODS IN AN OFDMA MULTICELL NETWORK

TECHNICAL FIELD

The present invention is broadly related to wireless communication systems, and specifically to systems and methods for intelligent terminal side demodulation in an Orthogonal Frequency Division Multiple Access (OFDMA) network.

BACKGROUND OF THE INVENTION

Most current multi-cell wireless communication systems are Time Division Multiple Access (TDMA) or Code Division Multiple Access (CDMA) based. In such wireless communication systems, particularly CDMA based systems where terminals are employing differing codes, the terminals often experience and hear intracell interference, as well as other interference from neighboring cells. Herein, interference received from other cells will be referred to as intercell interference or a leakage signal. Intracell interference may be created by a terminal itself and/or by transmissions to or from other terminals in a cell.

OFDMA is a highly flexible multiple-access scheme based on Orthogonal Frequency Division Multiplexing (OFDM) technology. OFDMA is the predominant multiple-access scheme of choice for beyond 3G (B3G) generation broadband wireless systems. The major benefits of OFDMA include simplicity, high scalability, fine granularity, and capacity-achieving performance. In OFDMA, the multiple-access is not only accommodated in the time domain, but also in the frequency domain. OFDMA is similar to conventional Frequency-Division Multiplexing (FDM) in that different terminals occupy different subchannels. The difference lies in the manner in which spectrum is allocated and in how signals are modulated and demodulated. In OFDMA priority is given to minimizing the interference, or crosstalk, among the channels and symbols comprising the data stream. Typically, less importance is placed on perfecting individual channels. OFDMA employs a very broad bandwidth, such as 5 MHz. Each terminal within a cell will use a certain portion of the bandwidth, such as by way of example 10 kHz. An OFDMA band employs numerous narrow frequency bands, referred to as sub-carriers, using Fast Fourier Transform (FFT) techniques. Typical OFDMA systems group a number of the sub-carriers into a subchannel. For example, 64 sub-carriers may be grouped into a subchannel. Within a cell, every terminal will occupy a different set of orthogonal subchannels in a non-overlapping fashion, relative to other terminals in the cell. As a result there is little or no intracell interference in OFDMA. This is a great advantage of OFDMA. Terminals have a clean channel and can transmit, using adaptive modulations, as fast as possible based on the terminal's subchannel's Received Signal Strength Indication (RSSI) and/or the like.

However, while there is no intracell interference in multi-cell systems employing OFDMA, a terminal will hear interference from other cells using the same subchannel as the terminal. As note above such interference may be referred to as intercell interference or a leakage signal. Typically, existing systems have used one of two categories of solutions in an attempt to address this problem. One is to use sectorization, as in a Global System for Mobile Communications (GSM) system, OFDMA based systems may try to reduce or at least suppress intercell interference by orienting the different antenna patterns and/or by using different frequencies, for sectors from two cells pointing to each other. However, this interference mitigation technique reduces overall system capacity, in that the subchannels that can be used in particular areas of a cell at any particular time is typically reduced.

The second approach for mitigating intrercell interference in typical OFDMA systems has been to employ subchannel patterns which "hop" over time. This subchannel may hop across the sub-carriers of the 5 Mhz bandwidth of the OFDMA band, with hopping patterns in different cells of a system being different. In this way a certain degree of so-called interference averaging is achieved. In effect, occasionally a "direct hit," for terminals from different cells using a same sub-carrier, may be encountered. However, in a next time slot, because the different cells use a different hopping pattern, a direct hit is avoided. The randomized, "smoothed" interference pattern resulting may be treated like other background interference. However, a best case situation, where there are no hits at all, will not typically result. Therefore, a problem exists with the latter prior intercell interference mitigation technique for multi-cell OFDMA systems in that by eliminating the worst case scenario of sequential direct hits, the best case scenario of no hits is not available. Some OFDMA systems using an interference averaging approach to deal with the intercell interference manage the interference by sometimes combining interference together, and sometimes separating the interference. Generally, interference averaging improves the worst-case performance of the system at the expense of lower network capacity.

SUMMARY

The present invention is directed to systems and methods which employ intelligent demodulation in an OFDMA muti-cell network, at the terminal, to mitigate intercell interference. The present systems and methods seek to the avoid network capacity loss associated with interference averaging by exploiting the structure information of the inference at the terminal. In contrast to existing OFDMA systems and methods, embodiments of the present invention overlaps, preferably fully overlaps, subchannels used by adjacent cells such that terminals of the present systems and methods receive both intended signals and interfering signals in a multiple input, multiple output (MIMO) fashion. Embodiments of terminals of the present systems and methods employ a multi-user decoding approach to eliminate the interference by using powerful decoding schemes. By overlapping the interferences, embodiments of the present invention, based on the channel and the interference information, enables cells to assign subchannels in such a manner as to maximize data throughput. This subchannel assignment may be made in a coordinated fashion, such as may be facilitated by intercommunication between base stations of a system employing the present invention.

Embodiments of an OFDMA terminal of the present invention may include a preamble processor that receives a preamble signal broadcast by the terminal's home base-station plus preamble signals broadcast by neighboring base-stations, a receiver that receives signal intended for the terminal and at least one interfering signal on a subchannel of the OFDMA wireless communication system, a single user decoder that is preferably adapted to decode only the intended signal, and one or more multi-user decoders, adapted to decode the intended signal and at least a portion of the interfering signal. The multi-user decoders may include a linear multi-user decoder and/or a non-linear multi-user decoder. The terminal also preferably includes demodulation scheme selection logic that selects between the single user decoder, the linear multi-user decoder and the non-linear multi-user decoder for demodulating/decoding the intended signal. This selection may be based, at least in part, on a strength of the interfering signal, relative to a strength of the intended signal. The aforementioned decoders may also be referred to as "detectors" or "demodulators."

The preamble processor may be used to derive a preamble of the intended signal and a preamble of the interfering signal, if possible. The selection between the single user decoder, the linear multi-user decoder and the non-linear multi-user decoder for demodulating the intended signal may also or alternatively, be based on information from the preamble derived from the interfering signal, such as. For example, the information from the preambles derived from the interfering signal may be used to determine if the linear multi-user decoding can satisfactorily decode the intended signal. In accordance with embodiments of the present invention, in addition to preambles, previously demodulated signal(s) may be used (together with the preamble signals) to select between single and multi-user decoders.

The linear multi-user decoder may include a filter used to filter out the decoded interfering signal. This filter may include a filter set based on a data structure of the interfering signal. Additionally or alternatively, the terminal may use beam forming to form an antenna pattern for the terminal with a null directed toward a base station or terminal transmitting the interfering signal. The source transmitting the interfering signal may be identified from the derived preamble of the interfering signal. The non-linear multi-user decoder of at least one embodiment is adapted to decode all of the interfering signal and then discard the decoded interfering signal when it is selected by the demodulation scheme selection logic to decode the intended signal.

Embodiments of base stations of the present invention preferably overlap subchannels used by a first cell of an OFDMA wireless communication system with subchannels used by at least one other cell of the OFDMA system in such a manner as to present any interfering signal appearing in said at least one other cell as a signal that overlaps a signal intended for use by a terminal of the first cell. The terminals may employ the aforementioned multi-user decoding to decode both a signal intended for the terminal and at least a portion of any interfering signal(s) on the same subchannel as the intended signal, and use the decoded interfering signal to improve decoding of the intended signal, such as by canceling the interfering signal.

An embodiment of an OFDMA communication system of the present invention may employ at least one of the aforementioned terminals and a plurality of the aforementioned base stations. Preferably, each of the base stations in communication with others of the base stations for exchanging information about data throughput for particular terminals in cells of the system using particular subchannels in the cells. Preferably, each of the base stations assigns the subchannels to terminals in the cell of the base station so as to maximize data throughput in the system. Each of the base stations may assign use of the subchannels to terminals in their cells which have the highest data throughput for the subchannel. However, other considerations may influence assignment, or non-assignment, of subchannels by a particular base station. For example, at least one of the base stations might not assign a particular subchannel for use in its cell because use of the subchannel by the base station would interfere with one or more terminals using the subchannel in a neighboring cell or because use of the subchannel by the at least one base station would prevent use of the subchannel in one or more neighboring cells. In accordance with embodiments of the present invention, centralized subchannel assignment among base stations can be used to maximize the total network throughput.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 3 is a diagram illustrating how channels may be overlapped in an OFDMA wireless communication system;

FIG. 4 is a logic flow diagram illustrating an embodiment of demodulation logic used in the present invention;

FIG. 7 shows subchannel assignment in a multi-cell system in accordance with embodiments of the present invention.

DETAILED DESCRIPTION

Figure 1:
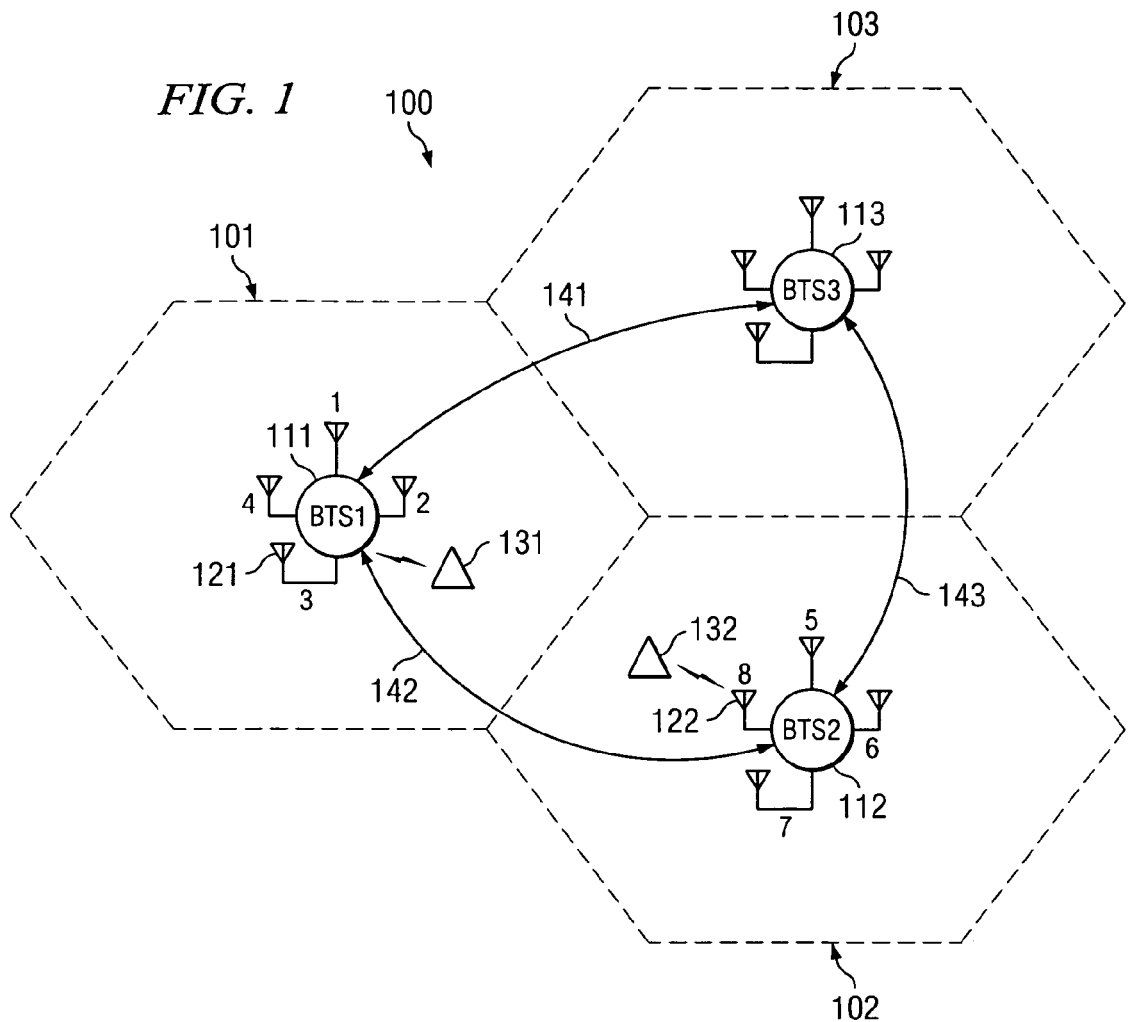
FIG. 1 is a diagrammatic view of an OFDMA based wireless communication system adapted in accordance with the present invention.

FIG. 1 is a diagrammatic view of at least a portion of multi-cell OFDMA based wireless communication system 100 employing the present systems and methods. Each cell, 101, 102 and 103, has a corresponding base station, 111, 112 and 113, respectively. Each cell may have multiple sectors, with each sector serviced by one or more antennas or antenna arrays of a base station, such as antenna 121 of base station 111 and antenna 122 of base station 112. Multiple antennas or antenna arrays may be used by base stations 111, 112 and 113 to provide beam forming, diversity transmission and reception, and the like. Base station 111 is shown in communication with terminal 131. For purposes of illustrating the present systems and methods, subchannel K of system 100 is being used to communicate with terminal 131. However, base station 112 is in communication with terminal 132 and again for purposes of illustrating the present invention, is using the same subchannel K. As one of ordinary skill in the art would readily appreciate, it is highly probable that at least a portion of the RF signal from base station 111 on subchannel K will leak into cell 102 and at least a portion of the RF signal from base station 112 on subchannel K will leak into cell 101 and thus be received by terminal 131 as interference with its communication with base station 121. In accordance with the present invention base stations 111, 112 and 113 may be adapted to overlap subchannels as described in greater detail below and to assign subchannels to users in such a manner as to enhance overall system data throughput, as also discussed in greater detail below. Base stations 111, 112 and 113 may communicate via links 141,142 and 143 to facilitate this channel assignment. Additionally, at least one terminals of embodiments of system 100 is adapted to receive and decode both signals intended for the terminal and at least a portion of interfering leakage signal(s) received on a same sub channel, and use information from the decoded interfering signal to improve decoding of the intended signal, as also described in greater detail below.

Figure 2:
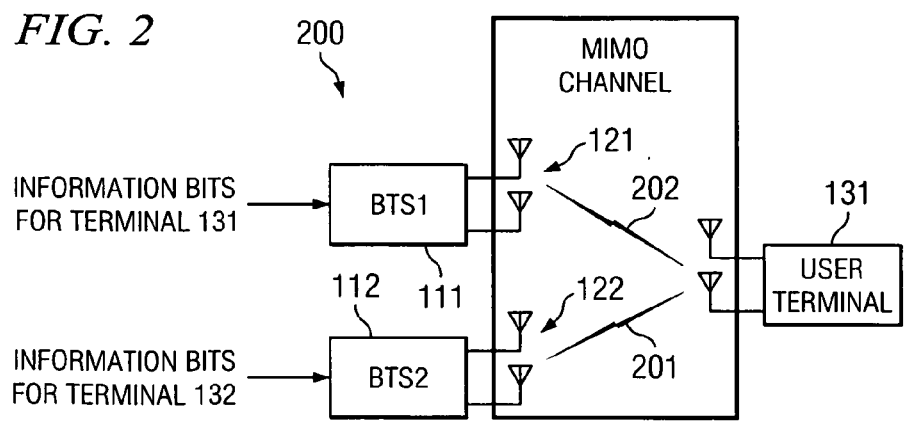
FIG. 2 is block diagram illustrating how a terminal receives intercell interference in FIG. 1.

FIG. 2 is block diagram of portion 200 of system 100 of FIG. 1, illustrating how a terminal, such as terminal 131, receives intercell interfering signal 201 in a multi-cell OFDMA wireless system. Without correction, the leakage of the RF signal from cell 102 using the same subchannel as data signal 202, intended for terminal 131, will be received as interference or background noise by terminal 131. Interfering signal 201 typically has a low signal to noise strength, relative to data signal 202. Interfering signal 201 typically affects terminal 131's data rate. Existing systems typically do not take advantage of knowledge of the neighboring cell. Signals originating from neighboring cells are typically considered part of the background noise and treated the same as other interference, using typical filtering, the aforementioned averaging techniques, or similar mitigation techniques. However, terminal 131 may be capable of actually receiving interfering signal 201, in addition to received data signal 202, transmitted from base station 112 and intended for terminal 132 of FIG. 1. This results in a MIMO channel configuration, which combines all useful information. In this case multiple input means that multiple sources of information, such as both the intended signal 202 and the interfering leakage signal 201, are being received, such as by terminal 131; and multiple output means that a receiving terminal, such as terminal 131 may employ the received signals, both the intended signal 202 and the interfering leakage signal 201, as output data, at least internally. For example, in accordance with the present invention information contained in interfering signal 201 may be treated as information rather than just as interference, such as by using a multi-user decoder scheme or joint decoding scheme, as discussed in greater detail below, to decode the information from both the intended signal 202 and interfering leakage signal 201. Therefore, in accordance with embodiments of the present invention the second signal, interfering leakage signal 201, is not treated as interference, as is typically done in existing OFDMA systems. Rather, interfering signal 201 is treated as part of a received signal, which is comprised of intended signal 202 and interfering signal 201, and which is decoded using joint decoding considering all received signals of a similar nature, such as transmitted on subchannel K using OFDMA, as useful information.

FIG. 3 is a time to frequency diagram illustrating how channels may be overlapped in an OFDMA wireless communication system. In FIG. 3 time frequency representation 301 a first cell is shown for comparison with time frequency representation 302 of a second cell. In a cell, at the beginning of a time slot, preambles 311 and 312 are broadcast for the respective cells. The preamble carries a beacon signal or the like for the associated base station. Each base station has its own preamble beacon signal. Following transmission of the preamble, the various data subchannels occupy the available bandwidth in time and frequency. For the sake of illustration in FIG. 3, the rectangles are intended to represent a collection of time and frequency as an RF "resource" designated to certain terminals. However, the resources used by a subchannel may not be uniformly distributed over time and/or frequency. In block 321 of cell 1 and block 322 of cell 2, the resource or subchannels are identical, subchannel K. Therefore, resources 321 and 322 are overlapped in time and frequency, directly interfering with respect to each other. Subchannel L resource 331 of cell 1 and subchannel L resource 332 of cell 2 only partially overlap in frequency, but are shown as synchronized in time. Therefore, resources 331 and 332 only partially interfere with each other. Furthermore, resources may partially overlap in both frequency and time, also resulting in mutual interference.

FIG. 4 is a logic flow diagram illustrating embodiment 400 of terminal demodulation logic, such as may be used in the present invention to enable higher overall system capacity in a system terminal, such as terminal 131. A terminal of the present invention receives signal 401, which may comprise both a signal intended for receipt by the terminal and interfering one or more interfering signals using a same subchannel. For example signal 401 may include both the signal intended for the terminal, such as signal 202 of FIG. 2 from base station 111 intended for terminal 131, as well as the portion of signal 401 that is not intended for the terminal, such as may include interfering signal 201 from base station 112 intended for terminal 132. The present invention will usually receive more than just two signals, a signal intended for the terminal and an interfering leakage signal. For example additional interfering leakage signals, might also be received, such as from base station 113 of FIG. 1 or from outside the OFDMA wireless system in which the terminal is operating. Preamble processor 402 will receive and process a preamble signal broadcast by the terminal's home base-station plus preamble signals broadcast by neighboring base-stations.

Channel profile selection may also be carried out in parallel with processing of the preamble. This channel profile selection may comprise comparing signal strength from a first source, such as a base station or other terminal, transmitting a signal intended to be received by the terminal, and at the same time monitoring signals from neighboring base stations. If the neighboring interference is very low, so as to be considered trivial, such as below a lower threshold or of insufficient strength to provide code information to the terminal, terminal demodulation scheme selection logic 403 may select to use single user decoder 404 to decode the signal intended for the user terminal. Single user decoder 404 preferably, ignores the interfering signal as a low strength background noise and/or treats the interfering signal in a manner such as other interference is treated. This results in an output of signal 405, the signal intended for the terminal, only. In accordance with the present invention terminals may also make use of multiple antennas for beam forming, diversity transmission and reception, and the like. For example, when using single user decoding, a terminal may "null out" a base station, in a manner known to those of skill in the art, to provide filtering.

On the other hand, if the interference from the preamble estimation of the interference signal strength provided by channel profile selector 402 is significant or strong, such as strong enough to provide code information, multi-user decoder 406 or 407 is preferably selected by demodulation scheme selection logic 403. Numerous multi-user decoders are known in the art. Two types of multi-user decoders are discussed herein and illustrated in FIG. 4, linear multi-user decoder 406, and a more powerful, non-linear multi-user decoder 407.

If the interference is above the aforementioned lower threshold, but not above an upper threshold, linear multi-user decoder 406 may be selected by demodulation scheme selection logic 403. One often-used scheme of linear multi-user decoding is commonly referred to as Minimum Mean Squared Error Multi-user Decoding (MMSE multi-user decoding). An MMSE multi-user decoder takes advantage of the data structure of the interfering signal, the interfering signal's algebraic structure. This data structure may be reflected in the signal's spatial structure, its coding structure, and/or the like. The MMSE multi-user decoder forms linear filter set 408, such as by forming coefficients, to filter out the interfering signal. Additionally, a terminal using linear multi-user decoding may null out a base station once it identifies the base station as the source of an interfering signal. Therefore, in accordance with embodiments of the present invention, when employing linear multi-user decoding the terminal need only decode the interfering signal long enough to derive filters 408, or long enough to identify the base station transmitting the intercell interference and thus the direction of intercell interference.

If the interference is above the aforementioned upper threshold demodulation scheme selection logic 403 preferably chooses to employ non-linear multi-user decoder 407. A typical example of a non-linear multi-user decoder is the so-called "maximum likelihood multi-user decoder." However, as will be appreciated by one of ordinary skill in the art, any number of multi-user decoders may be used in accordance with the present invention. Non-linear multi-user decoder 407 jointly decodes both data streams, the data intended for the terminal and the interfering leakage signal. Non-linear multi-user decoder 407 preferably discards the decoded interfering leakage signal data. However, by decoding both streams jointly, decoding of the data stream intended for the terminal may be significantly improved. The decoding of the intended signal is improved because, rather than treating the interfering signal as noise, which will result in the interfering signal imparting significant interference, the interfering signal is decoded and discarded, eliminating it as a source of interference, relative to the intended signal.

Whereas non-linear multi-user decoder 407 is more computational intensive, it may drain more battery power of a terminal, generate more heat and/or the like, if the linear multi-user decoder 406 or the single user decoder 404 will suffice one of these may be employed. Therefore, demodulation scheme selection 403 may compare not only the strengths of the signal intended for the terminal and an interfering signal, but also evaluate the knowledge of the two signals it can derive. As a result, demodulation scheme selection 403 preferably makes a prediction as to whether linear multi-user decoder 406 can satisfactorily decode the intended signal. By way of example, if linear multi-user decoder 406 demodulation can provide a certain Signal-to Noise Ratio (SNR) strength threshold and/or meet other threshold factors, the simpler linear multi-user decoder 406 will be used. However, if linear multi-user decoder 406 cannot satisfactorily decode the intended signal, such as failing to provide a threshold SNR strength and/or other threshold factors, resulting in an unacceptable error rate or other performance, non-linear multi-user decoder 407 is preferably used for decoding.

Figures 5, 6:
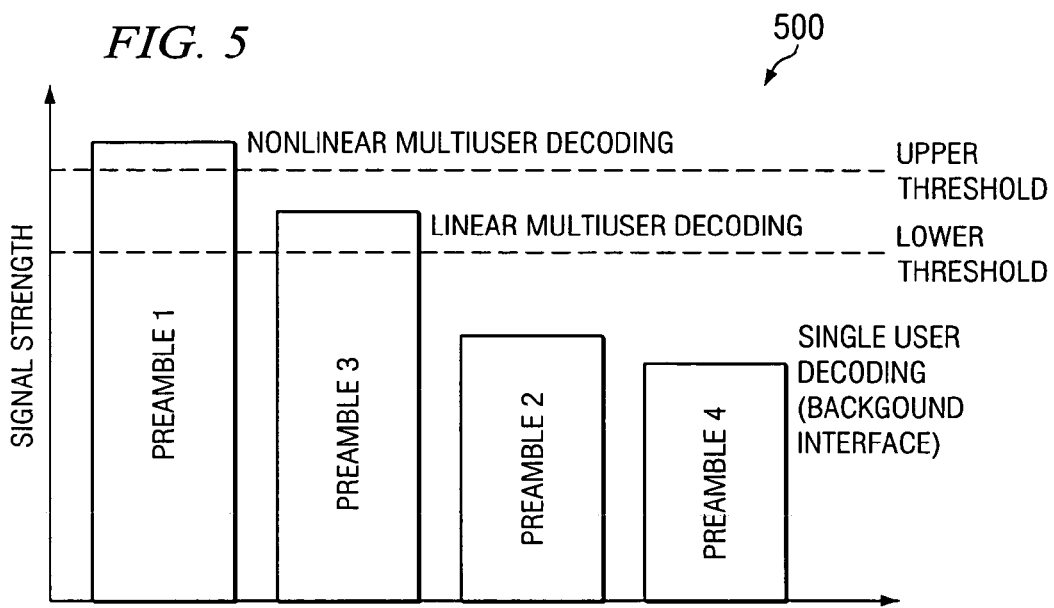
FIG. 5 is a diagram illustrating thesholding in terminal joint decoding in accordance with embodiments of the present invention.
FIG. 6 shows subchannel assignment by a single base station in accordance with embodiments of the present invention.

FIG. 5 is a diagram illustrating signal strength thresholding 500 in terminal demodulation scheme selection in accordance with embodiments of the present invention, such as at 403 in FIG. 4. Thresholding 500 looks to signal strengths of signals 1 through 4, preferably the signal strengths of the preambles of signals 1 through 4. These signal strengths may be used as a first level of evaluation of the interference from four interfering base stations and/or terminals. Preamble 1 is shown as having sufficient signal strength, above an upper signal strength threshold, to warrant, at least in a first approximation, nonlinear multi-user decoding. Meanwhile preamble 3 is shown as having only sufficient strength, above the lower signal strength threshold, but below the upper signal strength threshold, to warrant linear multi-user decoding. Whereas signal strength from preambles 2 and 4 are below the lower signal strength threshold, preambles 2 and 4 may be treated as background interference and ignored or filtered out in a conventional manner during single user decoding. Additionally or alternatively, embodiments of the present invention may employ previously demodulated signal(s), in addition to, or instead of, preamble signals, to assist in selecting between single and multi-user decoders.

However, embodiments of the present invention might treat all interfering signals alike, and once one signal breaches a signal strength threshold, all of the received signals are afforded the same type of demodulation/decoding. Under such an embodiment, the signals in FIG. 5 would all be subjected to nonlinear multi-user decoding since preamble 1 breaches the upper signal strength threshold.

Alternatively, all signals for which the preambles breach at least the lower signal strength threshold may be decoded using the scheme appropriate for the highest signal strength, while signals for which the preamble did not breach the lower signal strength threshold may be treated as background noise and ignored or filtered out in a conventional manner. In this latter embodiment, signals 1 and 3 of FIG. 5 would be subjected to nonlinear multi-user decoding since the preamble of signal 1 breaches the upper signal strength threshold and the preamble of signal 3 braches the lower signal strength threshold, even though it does not breach the upper signal strength threshold. Meanwhile, signals 2 and 4 would be treated as background noise and ignored or filtered out in a conventional manner, as the preambles of signals 2 and 4 fail to reach the lower signal strength threshold.

Attention is now directed to FIGS. 6 and 7, which tabulate subchannel assignment in accordance with embodiments of the present invention. In a multi-cell OFDMA system such as system 100 of FIG. 1 the base stations have the responsibility of assigning the subchannels. A traditional OFDMA system assigns subchannels more or less randomly, as a traditional OFDMA system sees the subchannels as more or less fungible. However, knowing whether a terminal has multi-user decoders in accordance with the present invention, or not, a difference arises in assigning the subchannels. FIG. 6 tabulates a comparison of possible data rates of a number of terminals for a single OFDMA base station. If the terminals are only capable of single user decoding then the terminal which can make the best use of the subchannel, that provides the highest usage of the spectrum associated with the subchannel, is assigned the subchannel, terminal c in FIG. 6. However, in accordance with embodiments of the present invention, if some of the user terminals also have multi-user decoders, then they can achieve higher data rates because they can eliminate interference. Therefore, in FIG. 6, since terminal b can achieve the highest data rate and since terminals a and c, possibly due to their locations, cannot achieve as high a data rate as terminal b, the subchannel is assigned to terminal b. In this manner a single OFDMA wireless communication base station employing the present invention employs intelligent channel assignment in consideration of whether the terminals have a multi-user decoder or a single user decoder and the data rates these terminals are capable of using.

FIG. 7 tabulates subchannel assignment in a multi-cell system in accordance with embodiments of the present invention. In a multi-cell OFDMA system, all the cells may use a subchannel simultaneously. The example of FIG. 7 shows a determination of how three such cells may assign a subchannel in accordance with the present invention. With a goal of maximizing throughput for the entire system, in light of other factors such as obligations to provide a minimum data rate to certain terminals. In accordance with the present invention both terminals with or without multi-user decoding performance are considered. Also, a consideration as to whether a particular subchannel should be used by certain cells may be appropriate. For example, a benefit, such as lowered interference for that subchannel in a neighboring cell, that benefits the overall performance of the system may be considered in subchannel assignment in accordance with the present invention. Given the achievable data rates of the terminals of FIG. 7, terminal 1b of cell 1, terminal 2c of cell 2, and terminal Na of cell N provides the maximum total throughput for the system of FIG. 7.

However, autonomous decision by each cell to assign a subchannel to its terminal that provides the highest throughput would not necessarily result in providing the highest throughput for the entire multi-cell system. Forcing the maximum throughput in one cell may affect other cells and lower the overall throughput of the system. For example, usage of a subchannel in a particular cell may destroy the potential usage of that subchannel in a plurality of other cells. Therefore, in accordance with the present invention the cells of a system may coordinate, such as via communication links 141-143 of FIG. 1, in order to enhance overall system throughput. For example, in FIG. 7, if assigning the subject subchannel to terminal 1b would detrimentally effect the use of that subchannel in a plurality of other cells, then the subject subchannel may be assigned to another terminal or not assigned at all in cell 1, even though assigning the subject subchannel to terminal 1b would provide a very high data rate for terminal 1b. Conversely, if nonassignment of the subject subchannel to terminal 1b would not enable more throughput in other cells, greater than the throughput afforded by assigning the subject subchannel to terminal 1b, the subject subchannel should be assigned to terminal 1b, unless it would have an impact on other factors, such as making any coverage at all unavailable to terminals in other cells. In the end, the goal of the present systems and methods is to maximize the total throughput across cells while satisfying fairness and other constraints. In accordance with embodiments of the present invention, centralized subchannel assignment among base stations can be used to maximize the total network throughput. However, the present invention may not employ centralized control, but rather distributed decision making process. For example, each cell's base station may share information with other cells, such as via communication links 141-143 of FIG. 1, particularly neighboring cells to provide distributed optimization. In this manner, each cell may assure it will not be adversely effecting other cells, particularly neighboring cells, by its subchannel assignments.

For example, base stations may cooperate or coordinate to overlap subchannel assignments in frequency and time so that terminals may more effectively use linear or non linear multi-user decoding to handle interfering leakage signals. With attention directed back to FIGS. 3 and 4, if the assignment of subchannels is fully overlapped in both frequency and time, the assignment of subchannel K is fully overlapped, relative to cells 1 and 2 in FIG. 3, then during demodulation, in accordance with the present invention (FIG. 4), linear or non linear multi-user decoding may be effectively used. However, if the subchannels are not fully overlapped, such as is shown for partially overlapped subchannel L in FIG. 3, the interference between the cells may be randomized. As a result, linear or non linear multi-user decoding might not be as effective, or even possible, and single user decoding and filtering might need to be used, typically resulting in a lower throughput for the subject terminal(s) and thus possibly for the overall system.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:

receiving a signal intended for a terminal of an Orthogonal Frequency Division Multiplexing Access (OFDMA) wireless communication system on a subchannel of said OFDMA system, wherein said terminal comprises a single user decoder, a linear multi-user decoder, and a nonlinear multi-user decoder;

receiving, by said terminal, an interfering signal on said subchannel;

selecting between said single user decoder, said linear multi-user decoder, and said nonlinear multi-user decoder to decode the intended signal, wherein said single user decoder decodes only said intended signal when selected and said multi-user decoders each decodes at least a portion of said interfering signal when selected;

wherein said selecting comprises;

selecting said single user decoder when determined that a strength of said interfering signal does not exceed a first threshold amount, selecting said linear multi-user decoder when determined that said strength of said interfering signal exceeds said first threshold amount but does not exceed a second threshold amount, and selecting said non-linear multi-user decoder when determined that said strength of said interfering signal exceeds both said first and second threshold amounts; and when said linear multi-user decoder or said non-linear multi-user decoder is selected for decoding at least a portion of said interfering signal, using the decoded portion of said interfering signal to decode said intended signal.

2. The method of claim 1 wherein said strength of said interfering signal is relative to said intended signal.

3. The method of claim 1 wherein said selecting between a linear multi-user decoder and a non-linear multi-user decoder is based at least in part on previously demodulated signals.

4. The method of claim 1 further comprising:
processing a preamble for said intended signal; and
processing a preamble for said interfering signal.

5. The method of claim 4 wherein said selecting between a linear multi-user decoder and a non-linear multi-user decoder is based at least in part on information from the preambles.

6. The method of claim 5 wherein said information from the preambles is used to determine if said linear multi-user decoding can satisfactorily decode said intended signal.

7. The method of claim 6 wherein said selecting between a linear multi-user decoder and a non-linear multi-user decoder is based at least in part on previously demodulated signals.

8. The method of claim 1 wherein said linear multi-user decoder, when selected, filters out the decoded interfering signal.

9. The method of claim 8 wherein said filtering out comprises forming a filter set based on a data structure of said interfering signal.

10. The method of claim 8 wherein said filtering out comprises forming an antenna pattern for said terminal with a null directed toward a source transmitting said interfering signal.

11. The method of claim 10 wherein said source transmitting said interfering signal is identified from said interfering signal.

12. The method of claim 1 wherein said non-linear multi-user decoder, when selected, decodes all of said interfering signal and then discards the decoded interfering signal.

13. The method of claim 1 further comprising:
filtering out the decoded interfering signal.

14. The method of claim 13 wherein said filtering out comprises discarding said decoded interfering signal.

15. The method of claim 13 wherein said filtering out comprises forming a filter set based on a data structure of said interfering signal.

16. The method of claim 13 wherein said filtering out comprises forming an antenna pattern for said terminal with a null directed toward a source transmitting said interfering signal.

17. The method of claim 16 wherein said source transmitting said interfering signal is identified from a derived preamble of said interfering signal.

18. An OFDMA terminal comprising:
means for receiving a signal intended for said terminal and at least one interfering signal on a subchannel of an OFDMA wireless communication system;
a single user decoder that is adapted to decode only said intended signal;
at least one multi-user decoder adapted to decode said intended signal and at least a portion of said interfering signal, wherein said at least one multi-user decoder comprises a linear multi-user decoder and a non-linear multi-user decoder; and
demodulation scheme selection logic selecting between said single user decoder, said linear multi-user decoder, and said non-linear multi-user decoder for demodulating said intended signal, wherein said demodulation scheme selection logic is adapted to evaluate a strength of said at least one interfering signal and select said single user decoder when determined that said strength of said at least one interfering signal does not exceed a first threshold amount, select said linear multi-user decoder when determined that said strength of said at least one interfering signal exceeds said first threshold amount but does not exceed a second threshold amount, and select said non-linear multi-user decoder when determined that said strength of said at least one interfering signal exceeds both said first and second threshold amounts.

19. The terminal of claim 18 wherein the strength of said at least one interfering signal is relative to a strength of said intended signal.

20. The terminal of claim 18 wherein said selecting between a linear multi-user decoder and a non-linear multi-user decoder is based at least in part on previously demodulated signals.

21. The terminal of claim 18 further comprising:
a preamble processor deriving a preamble of the intended signal and deriving a preamble of the interfering signal.

22. The terminal of claim 21 wherein the selection between said single user decoder, said linear multi-user decoder and said non-linear multi-user decoder for demodulating said intended signal is based at least in part on information from the preambles.

23. The terminal of claim 22 wherein said information from the preambles is used to determine if said linear multi-user decoding can satisfactorily decode said intended signal.

24. The terminal of claim 22 wherein said selecting between a linear multi-user decoder and a non-linear multi-user decoder is based at least in part on previously demodulated signals.

25. The terminal of claim 18 wherein said linear multi-user decoder comprises a filter used to filter out the decoded interfering signal when said linear multi-user decoder is selected by said demodulation scheme selection logic to decode said intended signal.

26. The terminal of claim 25 wherein said filter comprises forming a filter set based on a data structure of said interfering signal.

27. The terminal of claim 25 wherein said filter comprises means for forming an antenna pattern for said terminal with a null directed toward a source transmitting said interfering signal.

28. The terminal of claim 27 wherein said a source transmitting said interfering signal is identified from the derived preamble for said interfering signal.

29. The terminal of claim 18 wherein said non-linear multi-user decoder is adapted to decode all of said interfering signal and then discard the decoded interfering signal when said linear multi-user decoder is selected by said demodulation scheme selection logic to decode said intended signal.

30. A method comprising:
overlapping use of a subchannel used by a cell of an OFDMA wireless communications system with use of said subchannel by at least one other cell of said OFDMA system so as to intentionally cause interfering signals using the same subchannel in one of said cells to overlap with a signal intended to be received by at least one terminal using said subchannel in the one cell, wherein at least one terminal of said OFDMA system selectively employs one of a linear multi-user decoder and a non-linear multi-user decoder to decode a signal intended for said at least one terminal received on an assigned subchannel and at least a portion of an interfering signal received on said assigned subchannel, wherein said at least one terminal selectively employs said linear multi-user decoder when determined that a strength of said interfering signal exceeds a first threshold amount but does not exceed a second threshold amount, and said at least one terminal selectively employs said non-linear multi-user decoder when determined that the strength of said interfering signal exceeds said second threshold amount.

31. The method of claim 30 wherein said selected one of the multi-user decoders decodes only a portion of the interfering signal and filters out the decoded interfering signal.

32. The method of claim 31 wherein the filtering out comprises forming a filter set based on a data structure of said interfering signal.

33. The method of claim 31 wherein the filtering out comprises forming an antenna pattern for said terminal with a null directed toward a source transmitting said interfering signal.

34. The method of claim 31 wherein the selected one of the multi-user decoders decodes ail of the interfering signal and discards the decoded interfering signal.

35. An OFDMA communication system comprising:
a plurality of base stations intentionally overlapping use of a subchannel used by a cell of an OFDMA wireless communications system with use of said subchannel by at least one other cell of said OFDMA system, such that at least one interfering signal using a same subchannel in one of said cells overlaps with a signal intended to be received by at least one terminal using said subchannel in the one cell; and
a plurality of terminals, at least one of said terminals comprising:
a single user decoder that is adapted to decode only a signal intended for said at least one terminal received on a subchannel of said system,
a linear multi-user decoder,
a non-linear multi-user decoder, wherein each of said linear multi-user decoder and said non-linear multi-user decoder is adapted to decode said signal intended for said at least one terminal received on a subchannel of said system and at least a portion of said at least one interfering signal received on a same subchannel as said signal intended for said at least one terminal, and
demodulation scheme selection logic for selecting one of said single user decoder, said linear multi-user decoder, and said non-linear multi-user decoder for demodulating said signal intended for said at least one terminal, wherein said demodulation scheme selection logic is adapted to evaluate a strength of said at least one interfering signal and select said single user decoder when determined that said strength of said at least one interfering signal does not exceed a first threshold amount, select said linear multi-user decoder when determined that said strength of said at least one interfering signal exceeds said first threshold amount but does not exceed a second threshold amount, and select said non-linear multi-user decoder when determined that said strength of said at least one interfering signal exceeds both said first and second threshold amounts.

36. The system of claim 35 wherein said linear multi-user decoder is adapted to decode only a portion of the interfering signal and filter out the decoded interfering signal.

37. The system of claim 36 wherein the filtering out comprises forming a filter set based on a data structure of said interfering signal.

38. The system of claim 36 wherein the filtering out comprises forming an antenna pattern for said terminal with a null directed toward a source transmitting said interfering signal.

39. The system of claim 35 wherein the non-linear multi-user decoder is adapted to decode all of the interfering signal and discard the decoded interfering signal.

* * * * *

UNITED STATES PATENT AND TRADEMARK OFFICE
CERTIFICATE OF CORRECTION

PATENT NO. : 8,279,985 B2  
APPLICATION NO. : 11/062890  
DATED : October 2, 2012  
INVENTOR(S) : Hui Liu Page 1 of 1

It is certified that error appears in the above-identified patent and that said Letters Patent is hereby corrected as shown below:

<u>Title Page 2, Item (56), Other Publications:</u>
Column 1, line 16 (including heading), change "System:" to --System;--;
Column 2, line 15, change "Muitiuser" to --Multiuser--; and In the Claims:

<u>Column 13:</u>
Line 11, Claim 34, change "ail" to --all--.

Signed and Sealed this
Seventeenth Day of September, 2013

Teresa Stanek Rea
*Deputy Director of the United States Patent and Trademark Office*